United States Patent [19]

Rayburn et al.

[11] Patent Number: 4,703,969

[45] Date of Patent: Nov. 3, 1987

[54] STAKE AND RAIL ASSEMBLY FOR USE WITH VEHICLES AND THE LIKE

[76] Inventors: Albert M. Rayburn, 4401 N. 31st Dr., Phoenix, Ariz. 85017; Earl V. Cowell, H.C. 61, Box 1734, Dewey, Ariz. 86327

[21] Appl. No.: 867,232

[22] Filed: May 23, 1986

[51] Int. Cl.$^4$ ............................................... B60P 3/00
[52] U.S. Cl. .......................................... 296/3; 296/10; 296/26
[58] Field of Search .......................... 296/3, 10, 26, 43; 105/379

[56] References Cited

U.S. PATENT DOCUMENTS

| | | | |
|---|---|---|---|
| 2,080,764 | 5/1937 | Crawford | 296/10 |
| 4,216,988 | 8/1980 | Weiss | 296/43 |
| 4,423,899 | 1/1984 | Langmead | 296/3 |
| 4,585,264 | 4/1986 | Miller | 296/3 |

*Primary Examiner*—Robert R. Song
*Attorney, Agent, or Firm*—Harry M. Weiss & Associates

[57] ABSTRACT

A cargo space increasing assembly for use with a pickup truck bed comprising a rectangular structure formed of a pair of end members and side members which are attached to one another at the respective ends thereof, preferably by attaching means suitable for being coupled in a crisscross-like manner. Each end and side member consists of a plurality of vertical stake members to which a plurality of horizontal rail members are attached in such a manner that the bottom of the stake member extends beyond the bottom one of the respective rail members. An additional rail member is attached along the bottom of the bottom rail member of each side and end member and extends outwardly therefrom. A foam or plastic pad shaped to the additional rail member is attached along the bottom surface of the same. The assembly is meant as a temporary containment for loose cargo carried in the pickpu truck bed.

8 Claims, 9 Drawing Figures

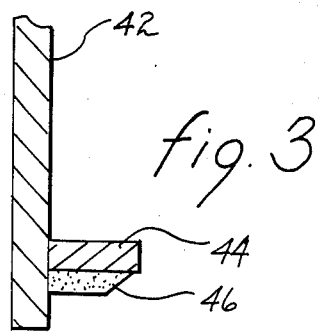
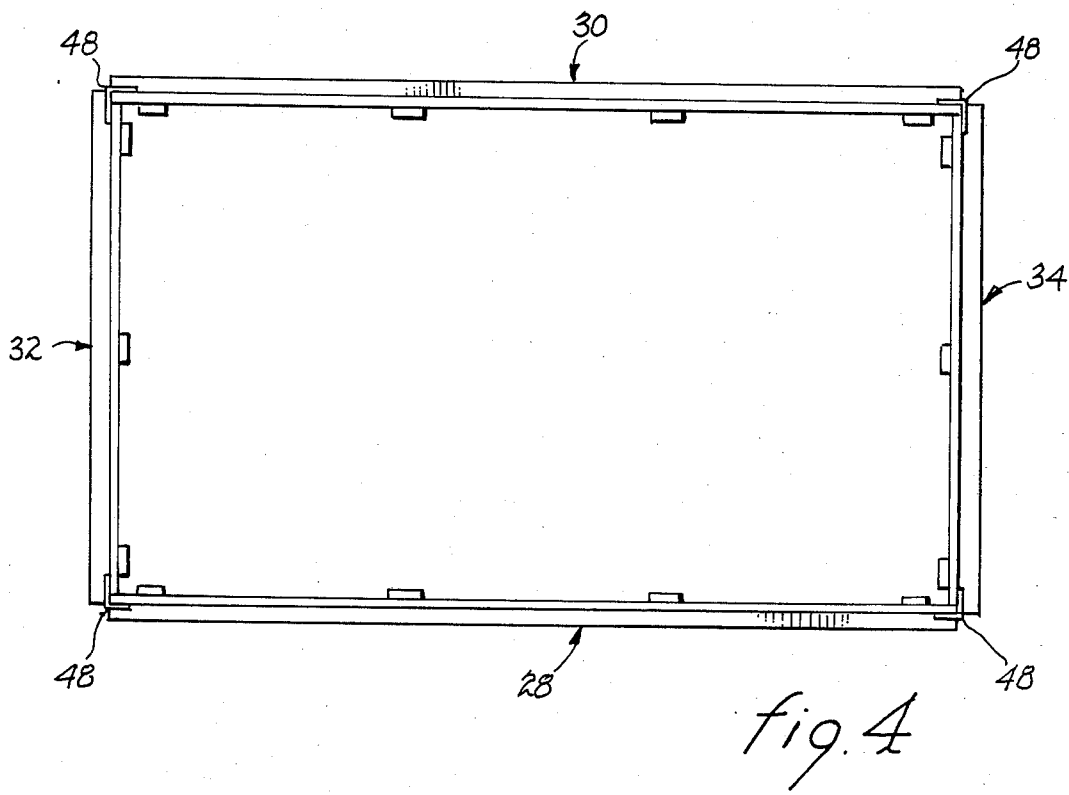
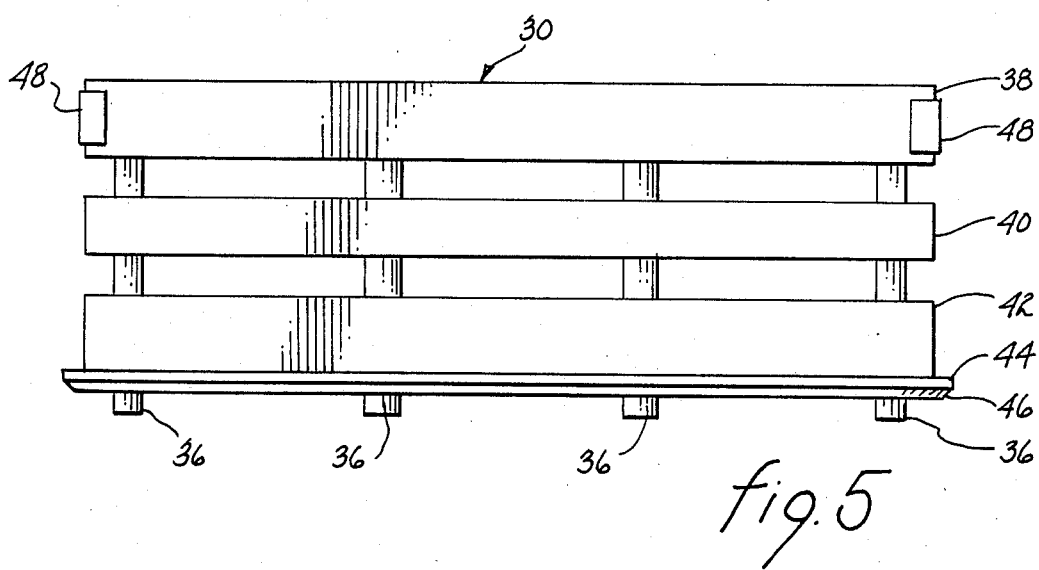

STAKE AND RAIL ASSEMBLY FOR USE WITH VEHICLES AND THE LIKE

BACKGROUND OF THE INVENTION

The present invention relates to cargo carrying vehicles and the like and, more particularly, to an assembly for increasing the cargo carrying space of a pickup truck bed and trailers made from the same to which the assembly is temporarily and securely attached.

Pickup trucks, as is well known, are commonly used for hauling light cargo such as crates and boxes containing different useful items. Furthermore, it is common to see pickup truck beds converted into trailers for towing behind other vehicles. These pickup truck beds are formed of a floor and extending side walls and end walls, one of the latter of which is hinged forming the tailgate. In general, the cargo carrying capacity of the truck bed is limited by the height of the extending side and end walls.

It is not unusual to see people attempting to carry more cargo than can be loaded into the bed of the pickup truck by stacking the cargo above the walls of the truck bed and using cord or other means to tie the load down. However, this is undesirable as a safety problem may occur as the cargo can shift while the vehicle is in transit, thus causing the cord to be loosened with resultant loss of the load.

Another means for increasing the cargo carrying capacity of those pickpup truck beds having cavities formed in the sidewalls thereof is to use a stake and rail assembly to increase the extending height of the walls of the bed. The stake members of the assembly are dimensioned to fit within the cavities of the sidewalls of the pickup bed. However, not all pickup truck beds are manufactured with such cavities formed therein to accommodate these type of stake and rail assemblies.

Hence, a need exists for an economical stake and rail assembly which is easily and removably attached to a pickup truck bed or the like for increasing the cubic cargo space thereof and which can be used with any vehicle manufacture's truck bed.

SUMMARY OF THE INVENTION

Accordingly, it is an object of the present invention to provide an improved assembly to increase the cubic cargo space of a pickup truck bed of the like.

It is another object of the present invention to provide an improved stake and rail assembly for use with a pickup truck any the like to increase the cargo carrying capabilities thereof.

Still another object of the present invention is to provide a stake and rail assembly suitable to be used in conjunction with a pickup truck bed for increasing the cubic cargo space thereof which assembly does not require cavities to be formed within the walls of the bed in order to securely and removably attach the assembly thereto.

In accordance with the above and other objects there is provided a cargo space increasing assembly for use with pickup truck beds and the like comprising first and second end and side members attached to one another at the respective corners thereof with the end members being oppositely positioned with respect to one another between the first and second side members, each one of the first and second side and end members, each one of the first and second side and end members having a plurality of vertical stakes in parallel spaced relationship to one another and a plurality of rails horizontally attached to the stakes in parallel relationship to each other, the bottom of each stake extending beyond the lower one of the rail members of each side and end member and each of the side and end members having an additional rail member attached along the bottom of the lower one of the rail members thereof which extends vertically outwards therefrom.

It is a feature of the present invention that the assembly is used in conjunction with a pickup truck bed with the assembly being temporarily and securely attached to the bed so as to increase the cubic cargo space of the bed.

BRIEF DESCRIPTION OF THE DRAWINGS

FIG. 3 is a cross sectional view of the rail assembly of the embodiment of FIG. 1 taken in the direction of arrows 3—3 of FIG. 2.

FIG. 4 is a top plan view illustrating the assembly of FIG. 1.

FIG. 5 is a side elevational view illustrating a longitudinal side member of the stake and rail assembly of FIG. 1.

DETAILED DESCRIPTION OF THE PREFERRED EMBODIMENT

Figure 1:
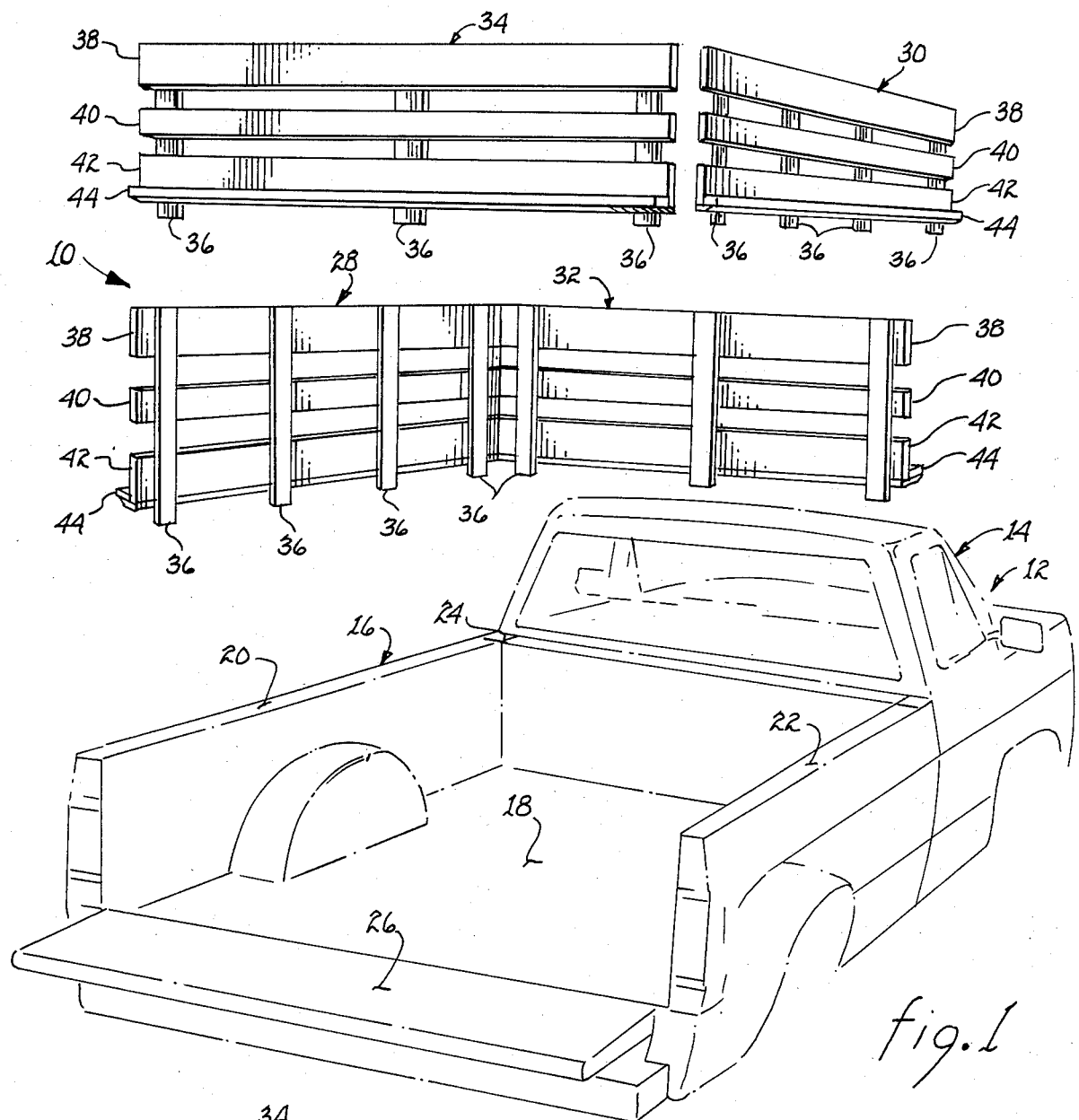
FIG. 1 is an exploded perspective view illustrating the stake and rail assembly of the preferred embodiment of the present invention in relation to the bed of a pickup truck.

It is to be understood that although the preferred embodiment of the present invention is described in relation to pickup trucks, the use thereof is not limited in conjunction therewith and is given for example only.

Turning to the Figures, there is shown stake and rail assembly 10 of the preferred embodiment of the present invention. Pickup truck 12 is conventional in structure and is illustrated as comprising cab 14 and truck bed 16. Truck bed 16 is formed of a floor 18, longtudinal or side walls 20 and 22, end wall 24 and tailgate 26. The side walls 20 and 22 may or may not have cavities formed therein along the length thereof.

As will be described in more detail later, stake and rail assembly 10 is assembled to fit onto truck bed 18 and extends upwardly from the side and end walls to thereby increase the cubic cargo space of the truck bed. Assembly 10 is comprised of first and second longitudinal side members 28 and 30 as well as first and second end members 32 and 34. As shown in FIGS. 1 and 5, each side and end members 28, 30, 32, 34 respectively is formed of a plurality of vertical stake members 36 which are in parallel spaced relationship to each other and a plurality of horizontal rail members 38, 40 and 42 which are attached to stake members 36. Rail members 38, 40 and 42 are generally positioned in parallel with rail 42 being the bottom rail. It is seen that the bottom of each stake member extends beyond lower rail member 42. Any conventional means may be used to attach rail members 38, 40 and 42 to respective stake members 36, for example, nails, screws or nuts and bolts to name but a few. Further, it is understood that assembly 10 can be manufactured using any suitable material such as wood for instance. An additional rail member 44 is attached perpendicularly to each bottom rail 42 respectively and extends outwardly therefrom. A foam or plastic pad 46 (see FIG. 3) is dimensioned and is attached to the bottom side of each respective additional rail member 44.

Figure 2:
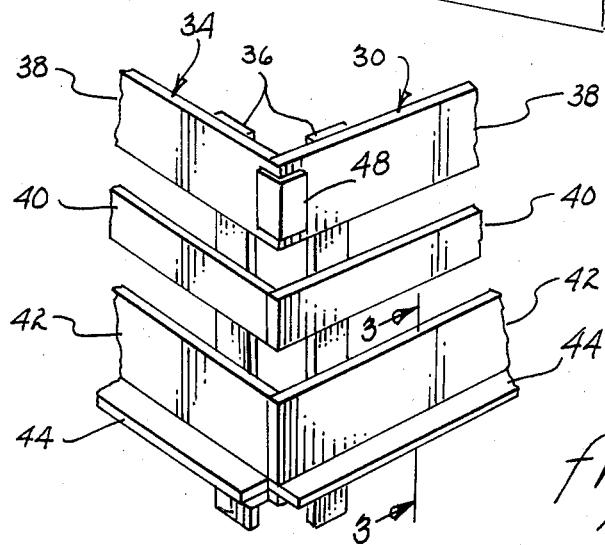
FIG. 2 is a partial perspective view illustrating a corner assembly of the embodiment of FIG. 1.

End members 32 and 34 are oppositely positioned between side members 28 and 30 with the respective corners adjacent to one another thereby forming a rectangular shape that generally conforms to the dimensions of the particular pickup truck bed upon which stake and rail assembly 10 is placed. The side members are attached to each of the end members at the corners. Thus, as illustrated in FIG. 2, side member 30 is connected with end member 34 using L-shape or angle bracket assemblies 48, preferably only at the upper portions thereof, as illustrated therein.

Figure 6:
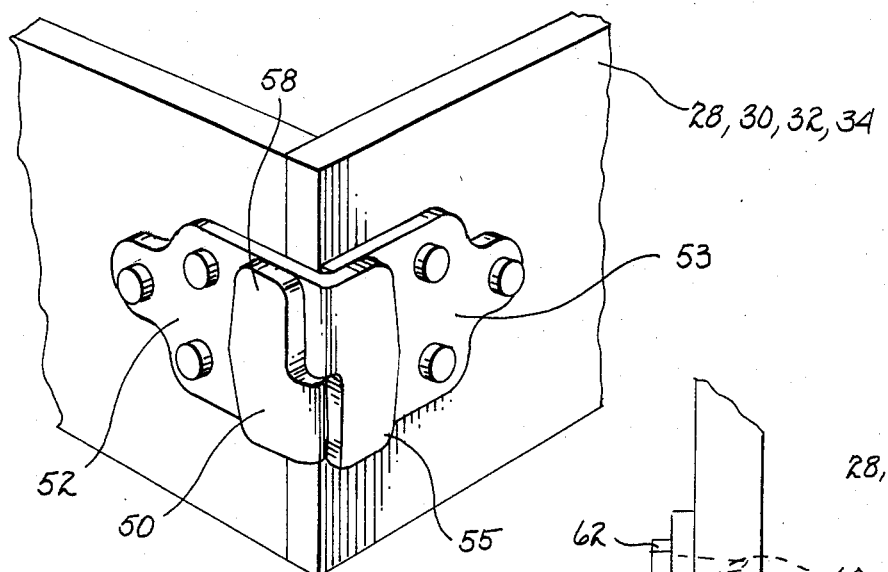
FIG. 6 is a perspective view of a preferred embodiment of the bracket assembly with associated longitudinal side and end members of the stake and rail assembly of the present invention.
Figure 7:
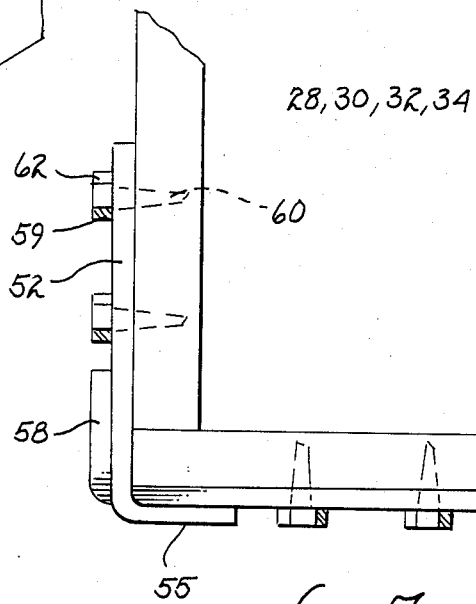
FIG. 7 is a top elevational view of said bracket assembly of the present invention showing the manner in which said bracket assembly is coupled to the longitudinal side ad end members.
Figure 9:
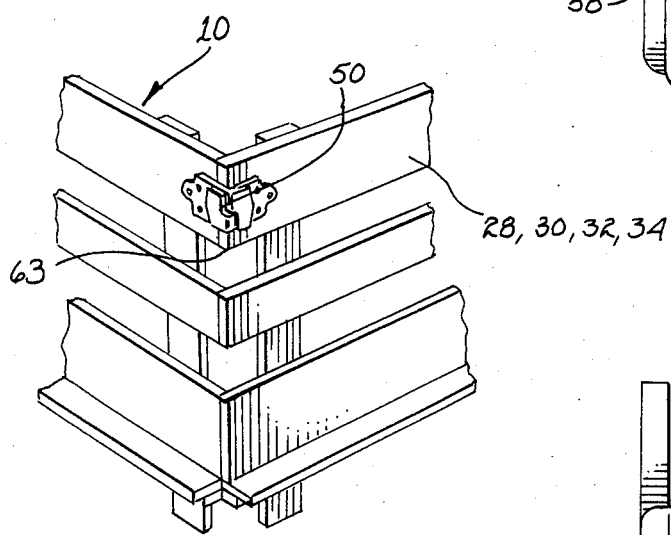
FIG. 9 is a partial perspective view showing the manner in which a corner of the stake and rail assembly of the present invention is assembled.
Figure 8:
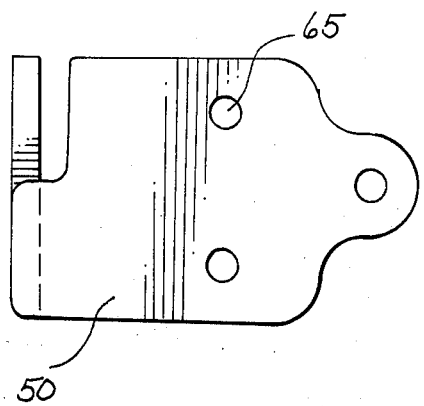
FIG. 8 is a side elevational view of at least one portion of said bracket assembly of the present invention.

As illustrated in FIG. 6, it is preferred that a bracket assembly 50 is used for operably connecting the longitudinal side 28, 30 and end 32 and 34 members. The bracket assembly comprises at least two members, a first 52 and second 53 members wherein the first member 52 has a downwardly protruding end portion 55 while the second member 53 has an upwardly protruding end portion 58. Both the first 52 and second 53 members are suitable for having the downwardly protruding end portion 55 rests thereabove the second member 53 while the upwardly protruding end portion 58 rests thereabove the first member 52 in a crisscross-like pattern for locking thereto. As also shown in FIG. 7, the first 52 and second 53 members are fastened to the longitudinal side 28, 30 and end 32, 34 members by a plurality of bolt-like members 59 having a head portion 62 and sharp ended portion 60. To better illustrate the use of the bracket assembly 50 in a corner portion 63 of the stake and rail assembly 10 of the present invention, FIG. 9 is shown with the bracket assembly 50 attached thereto. In FIG. 8, the bracket assembly 50 is illustrated having a plurality of apertures 65 for passing therethrough to accommodate the bolt-like members 59 therein. Here, the first 52 and second 53 members are substantially similar in shape and can be substantially interchanged with each other.

Once assembled, stake and rail assembly 10 is placed upon the side and end walls of the pickup truck bed and is held securely thereto. The open top and bottom of stake and rail assembly 10 provides temporary containment for loose cargo carried therein. As understood, stake and assembly 10 is dimensioned so that the bottom of stake members 36 fit within the inner dimensions of the particular truck bed to which it is placed upon. Moreover. the end member 34, as embodied in FIGS. 6-9 having at its ends the bracket assemblies 50 is suitable for being removably mounted onto said rail and stake assembly 10.

Hence, what has been described above is a novel stake and rail assembly suited to be used in conjunction with pickup truck beds for temporarily increasing the cargo capacity thereof.

While the preferred embodiment of the invention has been described fully, it should be understood that may modifications may be made to the invention which will fall within the scope of the appending claim

What is claimed is:

1. In combination with a pickup truck bed, an assembly for increasing the cubic cargo space of the truck bed onto which the assembly is placed, comprising:

a first side member having a plurality of spaced vertical stake members and a plurality of spaced horizontal rail members each of which is attached to said plurality of vertical stake members with the bottom of said stake members extending beyond the lowest one of said plurality of horizontal rail members;

a second side member having a plurality of spaced vertical stake members and a plurality of spaced horizontal rail members each of which is attached to said plurality of vertical stake members with the bottom of said stake members extending beyond the lowest one of said plurality of horizontal rail members;

a first end member having a plurality of spaced vertical stake members and a plurality of spaced horizontal rail members each of which is attached to said plurality of vertical stake members with the bottom of said stake members extending beyond the lowest one of said plurality of horizontal rail members;

a second end member having a plurality of spaced vertical stake members and a plurality of spaced horizontal rail members each of which is attached to said plurality of vertical stake members with the bottom of said stake members extending beyond the lowest one of said plurality of horizontal rail members;

means for attaching said first and second side members to said first and second end members, said first and second end members being positioned opposite of each other at the opposite ends of said first and second side members;

each of said first and second side and end members having an additional rail member perpendicularly attached to said lowest rail member thereof and extending therefrom, and said plurality of horizontal rail members being attached to the outside of said plurality of vertical stake members.

2. The assembly of claim 1 wherein each of said additional rail members of said first and second side and end members includes a pad attached to the bottom of said additional rail member.

3. The assembly of claim 2 wherein said first and second side and end members are placed on a truck bed with said pad being contiguous thereto.

4. An assembly for use with a truck bed to increase the cubic cargo space thereof, the truck bed having side walls and end walls defining a cargo space, comprising:

a first side member having a plurality of spaced horizontal rail members, each of said horizontal rail members attached to the outside of said plurality of vertical stake members with the bottom of said stake members extending beyond the lowest one of said plurality of horizontal rail members;

a second side members having a plurality of spaced vertical stake members and a plurality of spaced horizontal rail member each of said horizontal rail members attached to the outside of said plurality of vertical stake members with the bottom of said stake members extending beyond the lowest one of said plurality of horizontal rail members;

a first end member having a plurality of spaced vertical stake members and a plurality of spaced horizontal rail members each of said horizontal rail members attached to the outside of said plurality of vertical stake members with the bottom of said stake members extending beyond the lowest one of said plurality of horizontal rail members;

a second end member having a plurality of spaced vertical stake members and a plurality of spaced horizontal rail members each of said horizontal rail members attached to the outside of said plurality of vertical stake members with the bottom of said stake members extending beyond the lowest one of said plurality of horizontal rail members;

a second end member having a plurality of spaced vertical stake members and a plurality of spaced horizontal rail members each of said horizontal rail members attached to the outside of said plurality of vertical stake members with the bottom of said stake members extending beyond the lowest one of said plurality of horizontal rail members;

means for attaching said first and second side members to said first and second end members, said first and second end members being positioned opposite of each other at the opposite ends of said first and second side member; and each of said first and second side and end members having an additional rail member perpendicularly attached to said lowest rail member on the outside thereof and extending outwardly therefrom.

5. The assembly of claim 4 wherein each of said additional rail members of said first and second side and end members includes a pad attached to the bottom of said additional rail member.

6. The assembly of claim 5 wherein said first and second side and end members are placed on the truck bed with said pad beig contiguous with the side and end walls of the truck bed.

7. The assembly of claim 6 further comprising an attaching means for including a plurality of angle brackets attached to respective ones of the ends of adjacent side and end members forming a corner of the assembly.

8. The assembly of claim 7 wherein said attaching means comprises:

first and second members coupled to said respective ends of said adjacent side and end members by a plurality of bolt-like members, said first member has an upwardly extending end member and said second member has a downwardly extending end member to allow said upwardly extending end member to rest thereabove said first member and said downwardly extending end member to rest thereabove said second members attached therebetween in a crisscross-like manner.

* * * * *